United States Patent
Kotani et al.

(10) Patent No.: US 11,101,124 B2
(45) Date of Patent: *Aug. 24, 2021

(54) LASER DESORPTION/IONIZATION METHOD, MASS SPECTROMETRY METHOD, SAMPLE SUPPORT BODY, AND PRODUCTION METHOD FOR SAMPLE SUPPORT BODY

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/647,237

(22) PCT Filed: Aug. 6, 2018

(86) PCT No.: PCT/JP2018/029447
§ 371 (c)(1),
(2) Date: Mar. 13, 2020

(87) PCT Pub. No.: WO2019/058790
PCT Pub. Date: Mar. 28, 2019

(65) Prior Publication Data
US 2020/0273692 A1   Aug. 27, 2020

(30) Foreign Application Priority Data

Sep. 21, 2017 (JP) .............................. JP2017-181606

(51) Int. Cl.
*H01J 49/16* (2006.01)
*H01J 49/04* (2006.01)
*H01J 49/26* (2006.01)

(52) U.S. Cl.
CPC ........ *H01J 49/164* (2013.01); *H01J 49/0418* (2013.01); *H01J 49/26* (2013.01)

(58) Field of Classification Search
CPC ....... H01J 49/164; H01J 49/0418; H01J 49/26
See application file for complete search history.

(56) References Cited

U.S. PATENT DOCUMENTS 7,695,978 B2    4/2010   Laprade et al.
2002/0094533 A1    7/2002   Hess et al.
(Continued)

FOREIGN PATENT DOCUMENTS

EP    3 214 436 A1    9/2017
EP    3 214 437 A1    9/2017
(Continued)

OTHER PUBLICATIONS

International Preliminary Report on Patentability dated Apr. 2, 2020 for PCT/JP2018/029447.

*Primary Examiner* — Nicole M Ippolito
*Assistant Examiner* — Hanway Chang
(74) *Attorney, Agent, or Firm* — Faegre Drinker Biddle & Reath LLP

(57) ABSTRACT

A laser desorption/ionization method, includes: a first step of preparing a sample support body including a substrate on which a plurality of through holes opening to a first surface and a second surface facing each other are formed, a conductive layer provided on at least the first surface, and a matrix provided in the plurality of through holes; a second step of mounting a sample on a mounting surface of a mounting portion, and of disposing the sample support body on the sample such that the second surface is in contact with the sample; and a third step of ionizing a component of the sample that is mixed with the matrix and is moved to the first surface side from the second surface side through the (Continued)

through hole by irradiating the first surface with laser light while a voltage is applied to the conductive layer.

12 Claims, 11 Drawing Sheets

(56) References Cited

U.S. PATENT DOCUMENTS

| | | | |
|---|---|---|---|
| 2008/0078931 A1 | 4/2008 | Vestal et al. | |
| 2020/0266043 A1* | 8/2020 | Naito | H01J 49/10 |
| 2020/0273689 A1* | 8/2020 | Naito | G01N 27/62 |

FOREIGN PATENT DOCUMENTS

| | | |
|---|---|---|
| JP | 2007-309860 A | 11/2007 |
| JP | 2007-327910 A | 12/2007 |
| JP | 2009-002704 A | 1/2009 |
| JP | 2009-80106 A | 4/2009 |
| WO | WO-2017/038709 A1 | 3/2017 |

\* cited by examiner

Fig.10
(a) 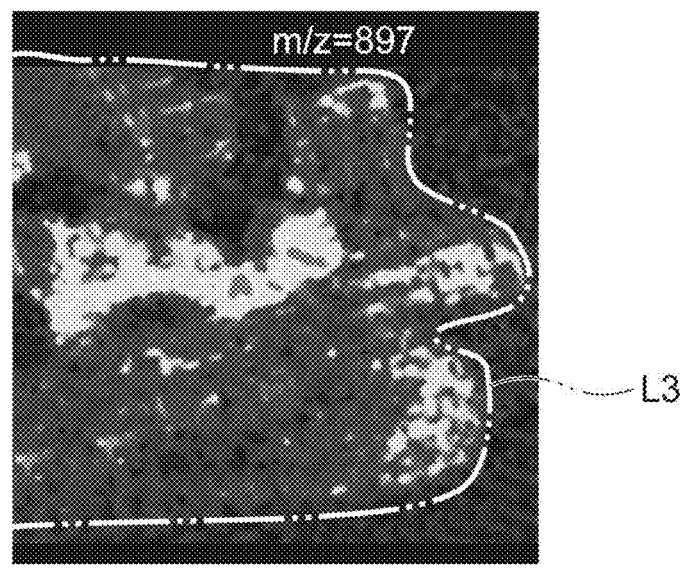
(b) 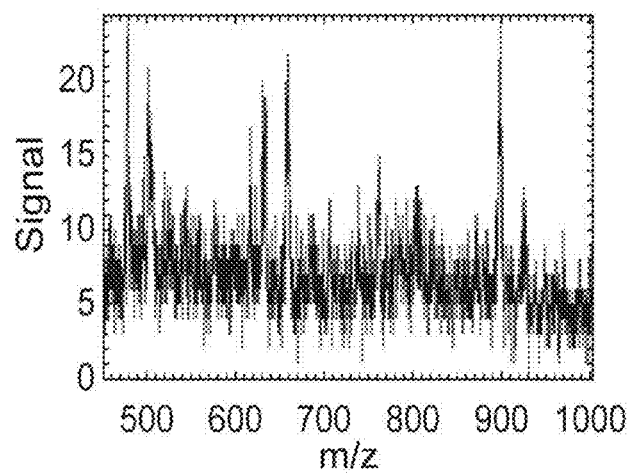

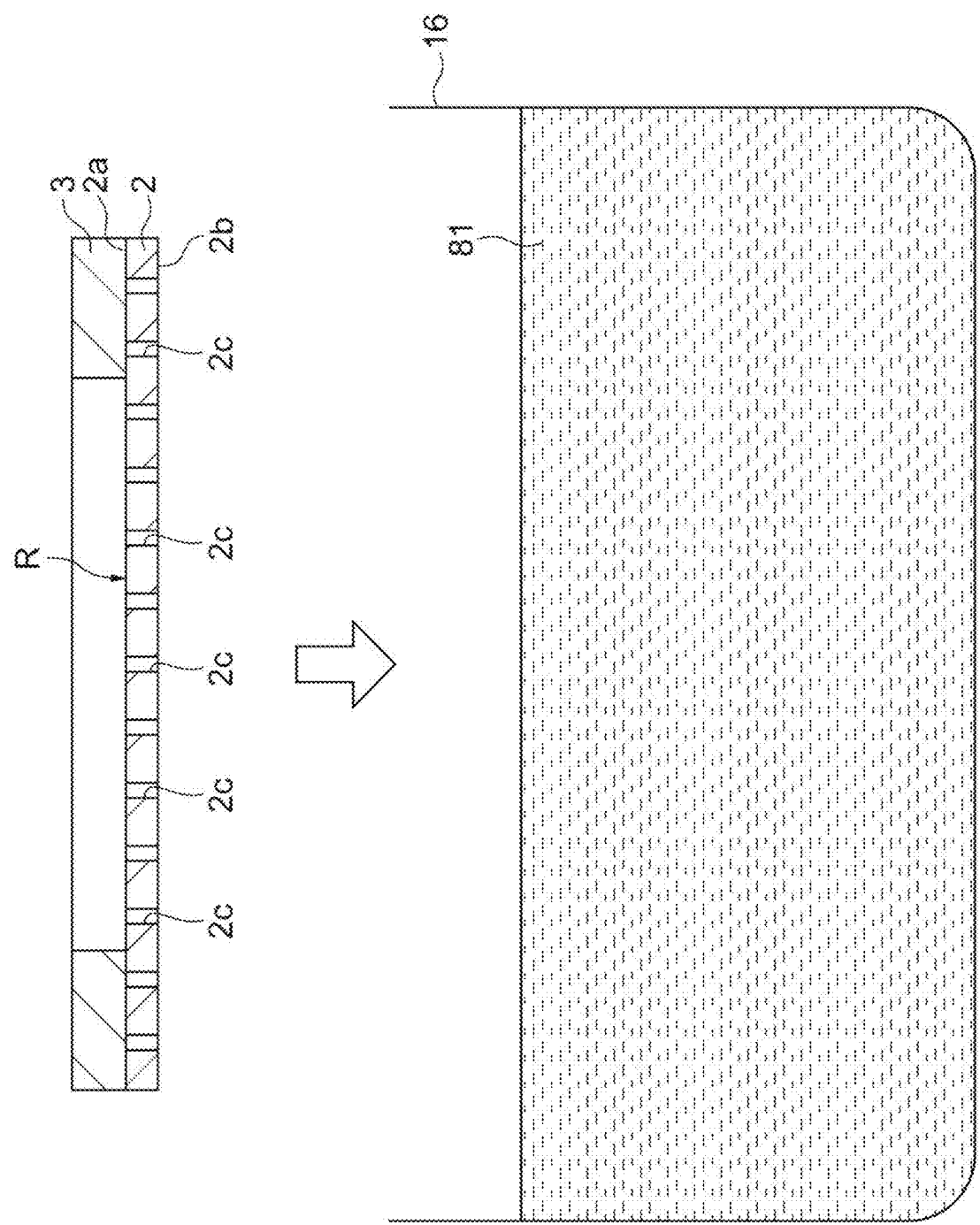

LASER DESORPTION/IONIZATION METHOD, MASS SPECTROMETRY METHOD, SAMPLE SUPPORT BODY, AND PRODUCTION METHOD FOR SAMPLE SUPPORT BODY

TECHNICAL FIELD

The present disclosure relates to a laser desorption/ionization method, a mass spectrometry method, a sample support body, and a production method for a sample support body.

BACKGROUND ART

In the related art, a matrix-assisted laser desorption/ionization (MALDI) method has been known as a method of ionizing a sample such as a biological sample in order to perform mass spectrometry or the like. The MALDI is a method of ionizing a sample by adding a low-molecular-weight organic compound referred to as a matrix that absorbs laser light into the sample, and by irradiating the sample with laser light. According to such a method, it is possible to ionize a thermally unstable substance or a high-molecular-weight substance in a non-destructive manner (so-called soft ionization).

CITATION LIST

Patent Literature

Patent Literature 1: U.S. Pat. No. 7,695,978

SUMMARY OF INVENTION

Technical Problem

However, in the case of using the MALDI as described above in imaging mass spectrometry of imaging a two-dimensional distribution of molecules configuring a sample, there is a limit to an increase in a resolution of an image.

Therefore, an object of the present disclosure is to provide a laser desorption/ionization method, a mass spectrometry method, a sample support body, and a production method for a sample support body in which a high-molecular-weight sample can be ionized, and a resolution of an image in imaging mass spectrometry can be improved.

Solution to Problem

A laser desorption/ionization method of one aspect of the present disclosure, includes: a first step of preparing a sample support body including a substrate on which a plurality of through holes opening to a first surface and a second surface facing each other are formed, a conductive layer disposed on at least the first surface, and a matrix provided in the plurality of through holes; a second step of mounting a sample on a mounting surface of a mounting portion, and of disposing the sample support body on the sample such that the second surface is in contact with the sample; and a third step of ionizing a component of the sample that is mixed with the matrix and is moved to the first surface side from the second surface side through the through hole by irradiating the first surface with laser light while a voltage is applied to the conductive layer, in a state in which the sample is disposed between the mounting portion and the sample support body.

In the laser desorption/ionization method, in a case where the sample support body is disposed on the sample, the component of the sample is moved to the first surface side from the second surface side through each of the through holes by a capillary phenomenon and is mixed with the matrix. Then, in a case where the first surface is irradiated with the laser light while a voltage is applied to the conductive layer, energy is transmitted to the component of the sample that is moved to the first surface side. Accordingly, the component of the sample is ionized. In the laser desorption/ionization method, the component of the sample is ionized by being mixed with the matrix, and thus, it is possible to reliably ionize a component of a high-molecular-weight sample. In addition, the component of the sample is moved to the first surface side through the plurality of through holes. For this reason, in the component of the sample that is moved to the first surface side of the substrate, position information of the sample (two-dimensional distribution information of molecules configuring the sample) is maintained. In such a state, the first surface of the substrate is irradiated with the laser light while a voltage is applied to the conductive layer, and thus, the component of the sample is ionized while the position information of the sample is maintained. Accordingly, it is possible to improve a resolution of an image in imaging mass spectrometry. As described above, according to such a laser desorption/ionization method, it is possible to ionize the high-molecular-weight sample and to improve the resolution of the image in the imaging mass spectrometry.

A laser desorption/ionization method of one aspect of the present disclosure, includes: a first step of preparing a sample support body including a substrate having conductivity on which a plurality of through holes opening to a first surface and a second surface facing each other are formed, and a matrix provided in the plurality of through holes; a second step of mounting a sample on a mounting surface of a mounting portion, and of disposing the sample support body on the sample such that the second surface is in contact with the sample; and a third step of ionizing a component of the sample that is mixed with the matrix and is moved to the first surface side from the second surface side through the through hole by irradiating the first surface with laser light while a voltage is applied to the substrate, in a state in which the sample is disposed between the mounting portion and the sample support body.

According to the laser desorption/ionization method, it is possible to omit the conductive layer from the sample support body, and to obtain the same effect as that in the case of using the sample support body including the conductive layer as described above.

A mass spectrometry method of one aspect of the present disclosure, includes: each of the steps of the laser desorption/ionization method described above; and a fourth step of detecting the component that is ionized in the third step.

According to the mass spectrometry method, it is possible to perform imaging mass spectrometry in which a high-molecular-weight sample can be ionized, and a resolution of an image can be improved.

A sample support body of one aspect of the present disclosure is a sample support body supporting a sample in a laser desorption/ionization method, the sample support body including: a substrate on which a plurality of through holes opening to a first surface and a second surface facing each other are formed; a conductive layer provided on at least the first surface; and a matrix provided in the plurality of through holes.

According to the sample support body, it is possible to ionize the high-molecular-weight sample as described above and to improve the resolution of the image in the imaging mass spectrometry.

In the sample support body of one aspect of the present disclosure, the substrate may be formed by performing anodic oxidation with respect to a valve metal or silicon. Accordingly, it is possible to suitably realize the movement of the component of the sample according to the capillary phenomenon described above.

In the sample support body of one aspect of the present disclosure, a width of the through hole may be 1 nm to 700 nm. In this case, it is possible to more smoothly move the component of the sample by the capillary phenomenon described above. In addition, it is possible to obtain sufficient signal intensity in mass spectrometry using the laser desorption/ionization method described above.

A sample support body of one aspect of the present disclosure is a sample support body supporting a sample in a laser desorption/ionization method, the sample support body including: a substrate having conductivity on which a plurality of through holes opening to a first surface and a second surface facing each other are formed; and a matrix provided in the plurality of through holes.

According to the sample support body, it is possible to omit the conductive layer, and to obtain the same effect as that of the sample support body including the conductive layer as described above.

A production method for a sample support body of one aspect of the present disclosure is a production method for a sample support body supporting a sample in a laser desorption/ionization method, the production method including: a first step of preparing a substrate on which a plurality of through holes opening to a first surface and a second surface facing each other are formed, and a conductive layer is provided on at least the first surface; a second step of introducing a matrix solution into the plurality of through holes; and a third step of drying the matrix solution.

According to the production method for a sample support body, it is possible to produce the sample support body in which the high-molecular-weight sample as described above can be ionized and the resolution of the image in the imaging mass spectrometry can be improved.

In the production method for a sample support body of one aspect of the present disclosure, in the second step, the matrix solution may be dropped with respect to the plurality of through holes from the first surface side or the second surface side. In this case, it is possible to easily introduce the matrix solution into each of the through holes.

In the production method for a sample support body of one aspect of the present disclosure, in the second step, the substrate may be dipped in the matrix solution. In this case, it is possible to easily introduce the matrix solution into each of the through holes.

A production method for a sample support body of one aspect of the present disclosure is a production method for a sample support body supporting a sample in a laser desorption/ionization method, the production method including: a first step of preparing a substrate having conductivity on which a plurality of through holes opening to a first surface and a second surface facing each other are formed; a second step of introducing a matrix solution into the plurality of through holes; and a third step of drying the matrix solution.

According to such a production method for a sample support body, it is possible to produce the sample support body in which the conductive layer can be omitted, and the same effect as that of the sample support body including the conductive layer as described above can be obtained.

Advantageous Effects of Invention

According to the present disclosure, it is possible to provide a laser desorption/ionization method, a mass spectrometry method, a sample support body, and a production method for a sample support body in which a high-molecular-weight sample can be ionized, and a resolution of an image in imaging mass spectrometry can be improved.

Figure 8:
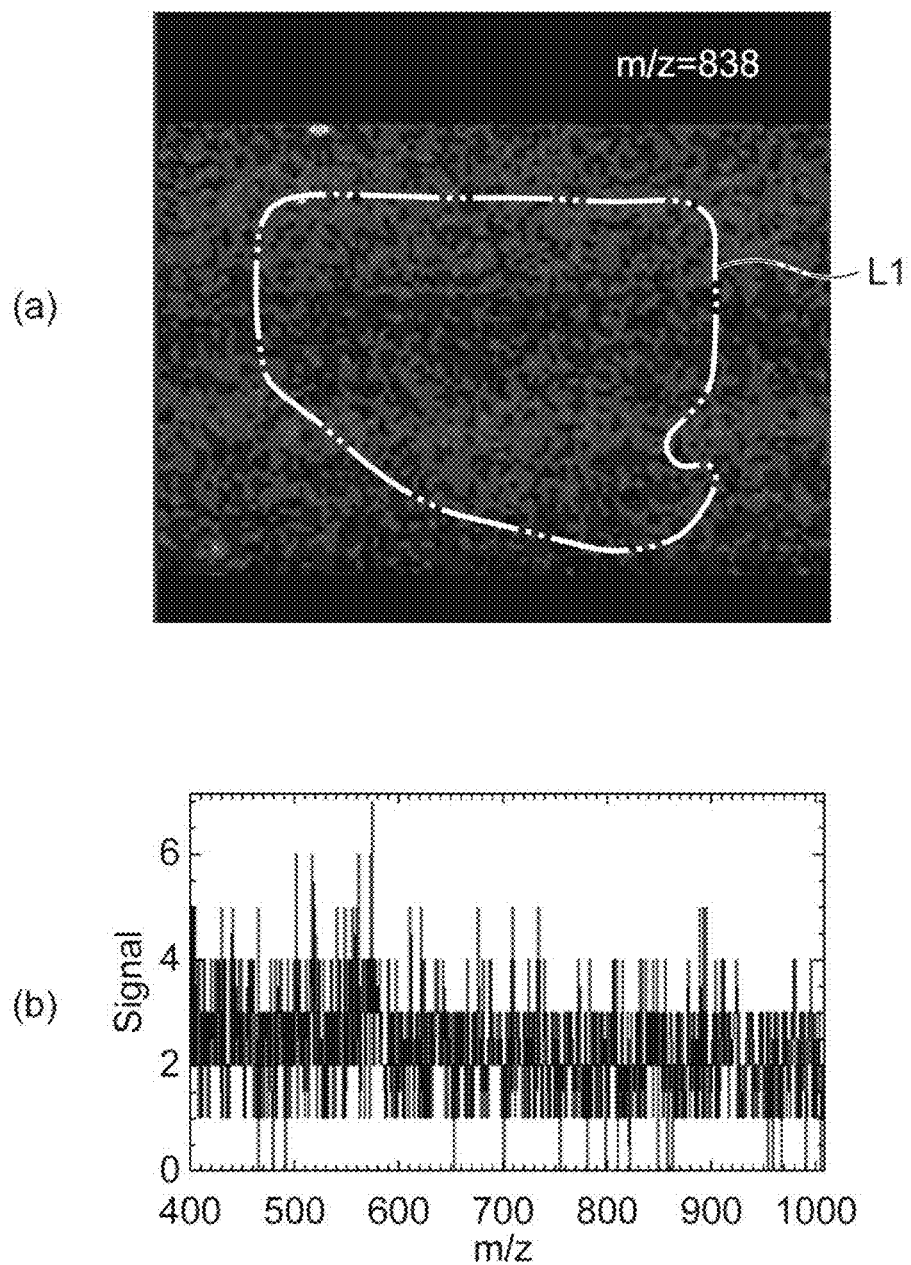

(a) of FIG. 8 is a two-dimensional image according to a mass spectrometry method of a comparative example, and (b) of FIG. 8 is a mass spectrum according to the mass spectrometry method of the comparative example.

Figure 9:
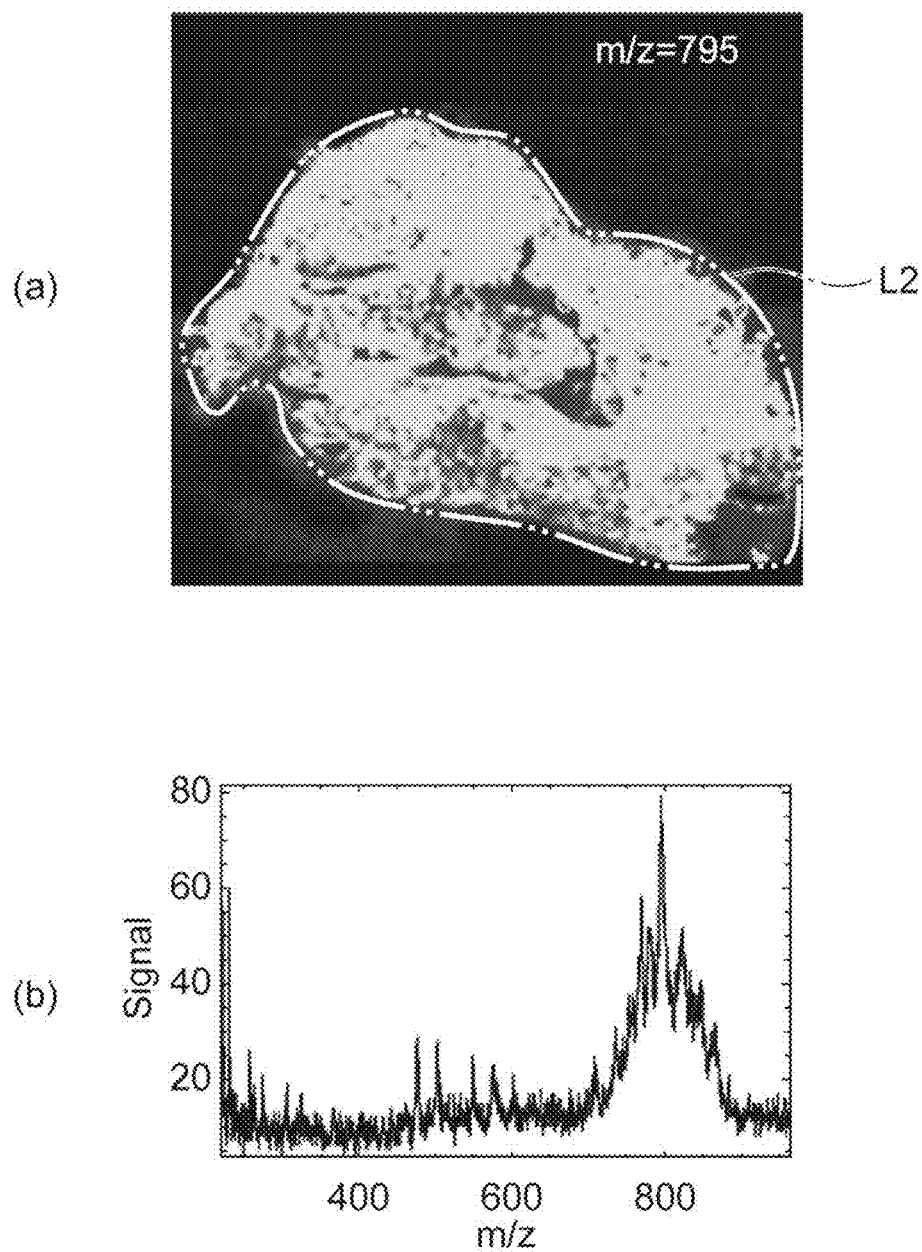

(a) of FIG. 9 is a two-dimensional image according to a mass spectrometry method of an example, and (b) of FIG. 9 is a mass spectrum according to the mass spectrometry method of the example.

(a) of FIG. 10 is a two-dimensional image according to a mass spectrometry method of another example, and (b) of FIG. 10 is a mass spectrum according to the mass spectrometry method of another example.

FIG. 11 is a diagram illustrating steps of a production method for a sample support body of a modification example.

DESCRIPTION OF EMBODIMENTS

Hereinafter, an embodiment of the present disclosure will be described in detail with reference to the drawings. Furthermore, in each of the drawings, the same reference numerals will be applied to the same portions or the corresponding portions, and the repeated description will be omitted.

First Embodiment

Figure 1:
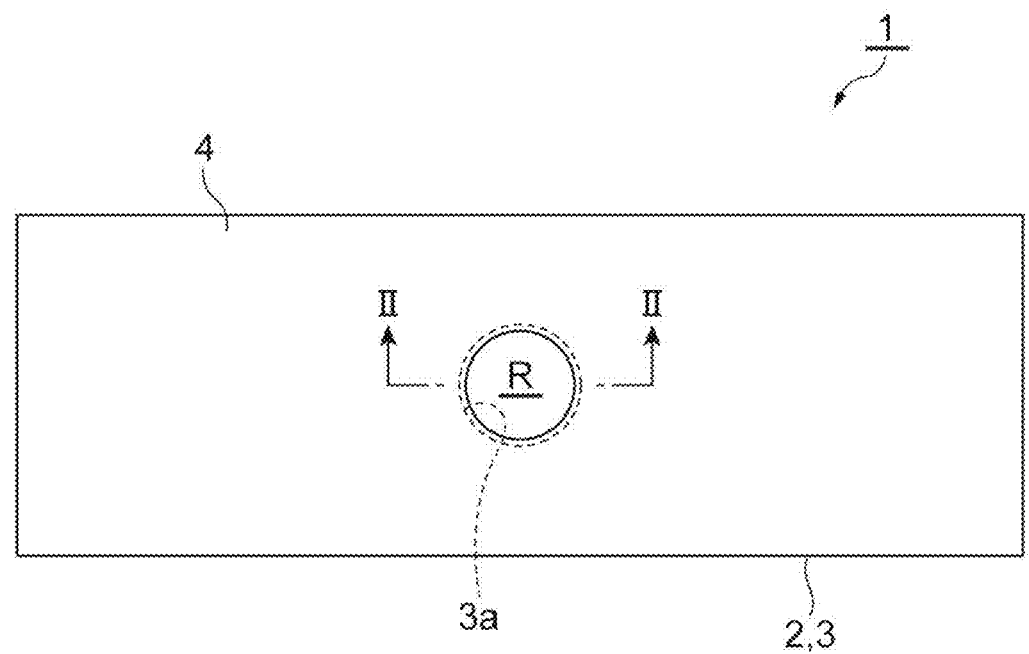
FIG. 1 is a plan view of a sample support body of one embodiment.
Figure 2:
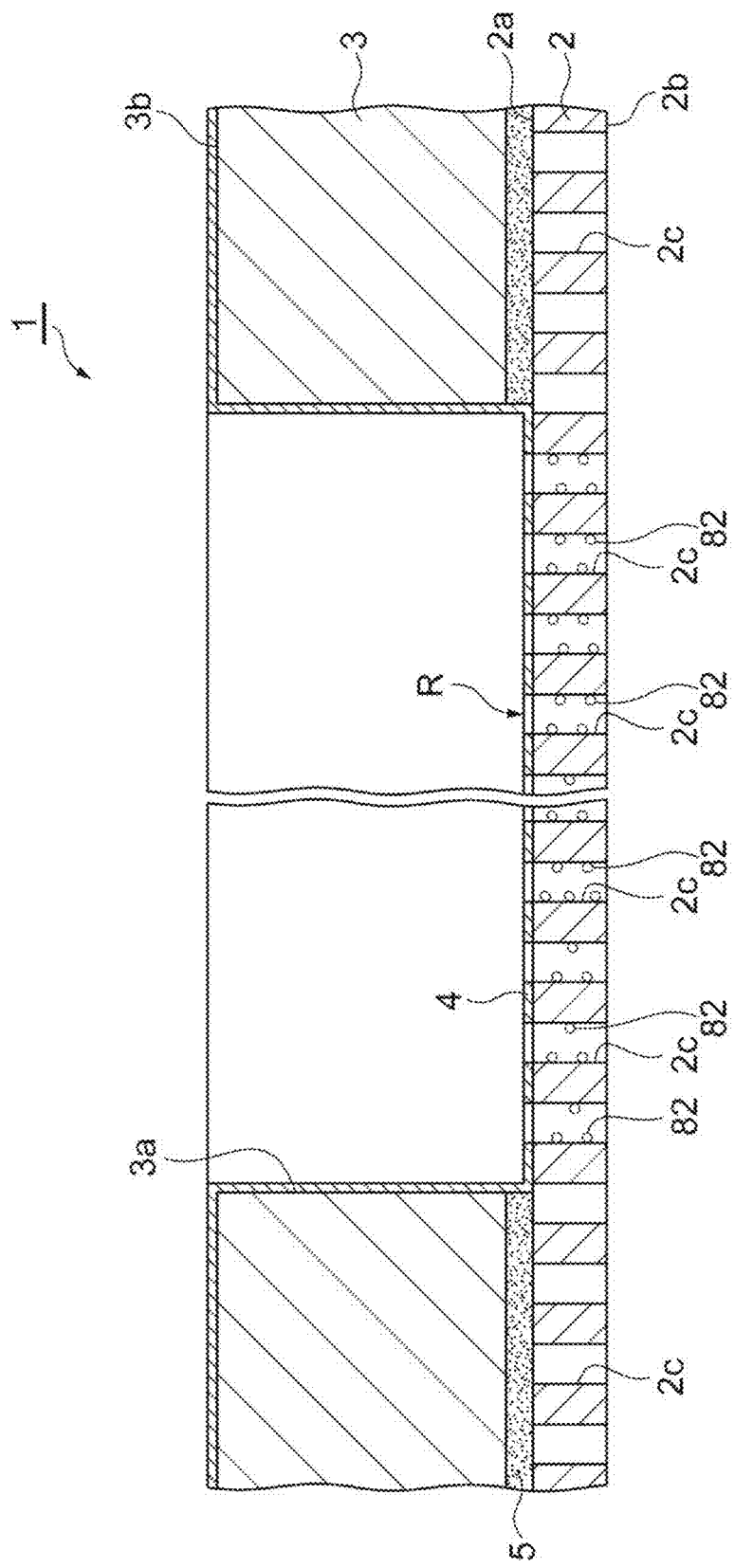
FIG. 2 is a sectional view of the sample support body along line II-II illustrated in FIG. 1.

First, a sample support body of one embodiment will be described. As illustrated in FIG. 1 and FIG. 2, a sample support body 1 includes a substrate 2, a frame 3, a conductive layer 4, and a matrix 82. The substrate 2 includes a first surface 2a and a second surface 2b facing each other. A plurality of through holes 2c are formed on the substrate 2 uniformly (with a homogeneous distribution). Each of the through holes 2c extends along a thickness direction of the substrate 2 (a direction perpendicular to the first surface 2a and the second surface 2b), and opens to the first surface 2a and the second surface 2b.

The substrate 2, for example, is formed of an insulating material into the shape of a rectangular plate. The length of one side of the substrate 2 when seen from the thickness direction of the substrate 2, for example, is approximately several cm, and the thickness of the substrate 2, for example, is approximately 1 μm to 50 μm. The through hole 2c, for example, is approximately in the shape of a circle when seen from the thickness direction of the substrate 2. The width of the through hole 2c is 1 nm to 700 nm. The width of the through hole 2c indicates the diameter of the through hole 2c in a case where the through hole 2c is approximately in the shape of a circle when seen from the thickness direction of the substrate 2, and indicates the diameter (an effective diameter) of a virtual maximum cylinder falling into the through hole 2c in a case where the through hole 2c is not approximately in the shape of a circle. A pitch between the respective through holes 2c is 1 nm to 1000 nm. The pitch between the respective through holes 2c indicates a center-to-center distance of the respective circles in a case where the through hole 2c is approximately in the shape of a circle when seen from the thickness direction of the substrate 2, and indicates a center axis-to-center axis distance of the virtual maximum cylinder falling into the through hole 2c in a case where the through hole 2c is not approximately in the shape of a circle.

The frame 3 is provided on the first surface 2a of the substrate 2. Specifically, the frame 3 is fixed to the first surface 2a of the substrate 2 by an adhesive layer 5. It is preferable that an adhesive material having less emitted gas (for example, glass with a low melting point, a vacuum adhesive agent, and the like) is used as the material of the adhesive layer 5. The frame 3 has approximately the same outer shape as that of the substrate 2 when seen from the thickness direction of the substrate 2. An opening 3a is formed in the frame 3. A portion corresponding to the opening 3a in the substrate 2 functions as an effective region R for moving a component of a sample described below to the first surface 2a side.

The frame 3, for example, is formed into the shape of a rectangular plate by the insulating material. The length of one side of the frame 3 when seen from the thickness direction of the substrate 2, for example, is approximately several cm, and the thickness of the frame 3, for example, is less than or equal to 1 mm. The opening 3a, for example, is in the shape of a circle when seen from the thickness direction of the substrate 2, and in such a case, the diameter of the opening 3a, for example, is approximately several mm to several tens of mm. By such a frame 3, the handling of the sample support body 1 is facilitated, and the deformation of the substrate 2 due to a temperature change or the like is suppressed.

The conductive layer 4 is provided on the first surface 2a of the substrate 2. Specifically, the conductive layer 4 is formed in a region corresponding to the opening 3a of the frame 3 on the first surface 2a of the substrate 2 (that is, a region corresponding to the effective region R), and is continuously (integrally) formed on an inner surface of the opening 3a, and a surface 3b on a side opposite to the substrate 2 of the frame 3. In the effective region R, the conductive layer 4 covers a portion in which the through hole 2c is not formed on the first surface 2a of the substrate 2. That is, in the effective region R, each of the through holes 2c is exposed to the opening 3a.

The conductive layer 4 is formed of a conductive material. However, it is preferable that a metal having low affinity (reactivity) with respect to a sample S and high conductivity is used as the material of the conductive layer 4, from the following reasons.

For example, in a case where the conductive layer 4 is formed of a metal such as copper (Cu) having high affinity with respect to a sample such as protein, in a process of ionizing the sample described below, the sample is ionized in a state where Cu atoms are attached to sample molecules. Then, there is a concern that a detection result is shifted in the mass spectrometry method described below as the Cu atoms are attached. Therefore, it is preferable that a metal having low affinity with respect to the sample is used as the material of the conductive layer 4.

On the other hand, a metal easily and stably applies a constant voltage as conductivity is high. For this reason, in a case where the conductive layer 4 is formed of a metal having high conductivity, it is possible to homogeneously apply a voltage to the first surface 2a of the substrate 2 in the effective region R. In addition, there is a tendency that a metal has high thermal conductivity as conductivity is high. For this reason, in a case where the conductive layer 4 is formed of a metal having high conductivity, it is possible to efficiently transfer the energy of laser light that is applied to the substrate 2 to the sample through the conductive layer 4. Therefore, it is preferable that a metal having high conductivity is used as the material of the conductive layer 4.

From the viewpoint described above, for example, it is preferable that gold (Au), platinum (Pt), and the like are used as the material of the conductive layer 4. The conductive layer 4, for example, is formed to have a thickness of approximately 1 nm to 350 nm by a plating method, an atomic layer deposition (ALD) method, a vapor deposition method, a sputtering method, and the like. Furthermore, for example, chromium (Cr), nickel (Ni), titanium (Ti), and the like may be used as the material of the conductive layer 4.

The matrix 82 is provided in the plurality of through holes 2c. The matrix 82 is provided in each of the through holes 2c in at least the effective region R. The matrix 82 is provided on an inner wall surface of each of the through holes 2c. The matrix 82 is an organic compound that absorbs laser light. The matrix 82, for example, is crystals containing a 2,5-dihydroxybenzoic acid (DHB). Furthermore, the matrix 82 may not be provided in each of the through holes 2c. In the effective region R, the matrix 82 may be provided in at least one of the first surface 2a side of the substrate 2 and the second surface 2b side of the substrate 2, in each of the through holes 2c. In the effective region R, the matrix 82 may be provided in at least one of the surface of the conductive layer 4 and the second surface 2b of the substrate 2, in each of the through holes 2c. That is, the matrix 82 being provided in the plurality of through holes 2c indicates that the matrix 82 is provided in the vicinity of each of the through holes 2c.

Figure 3:
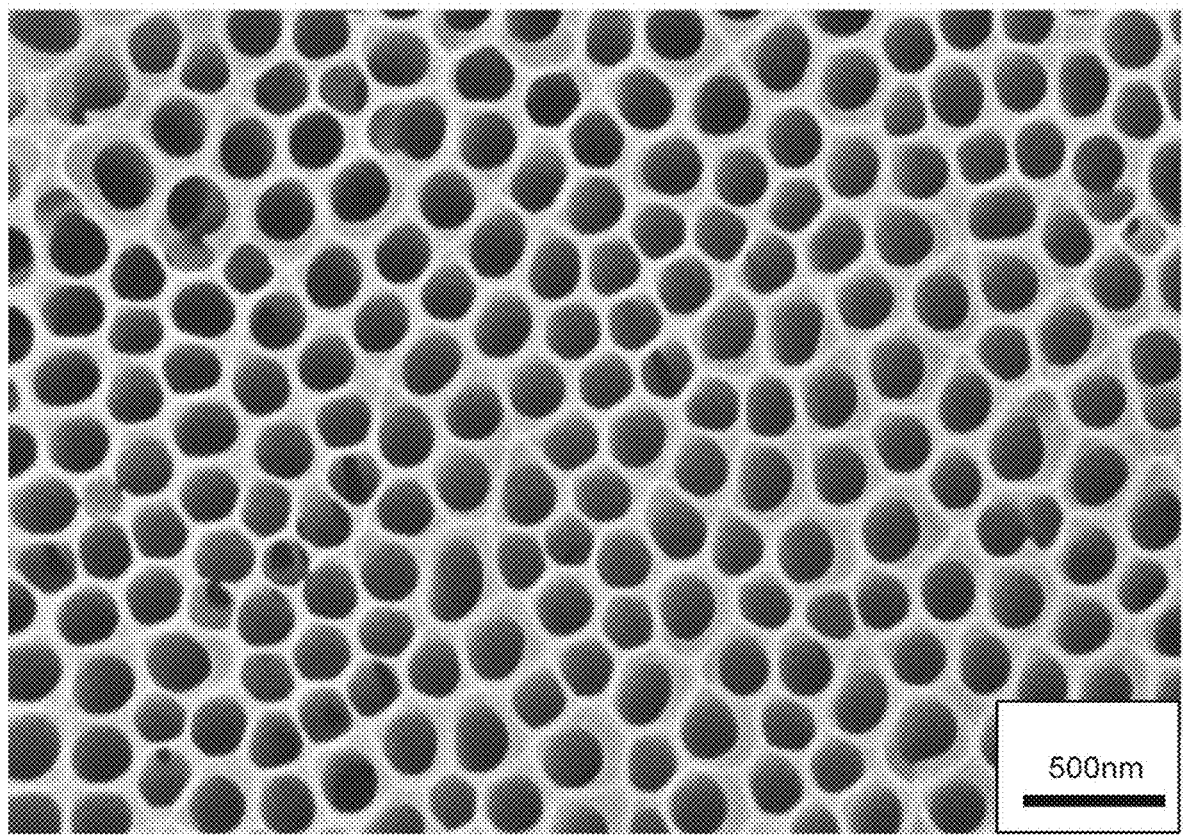
FIG. 3 is a diagram illustrating an enlarged image of a substrate of the sample support body illustrated in FIG. 1.

FIG. 3 is a diagram illustrating an enlarged image of the substrate 2 when seen from the thickness direction of the substrate 2. In FIG. 3, a black portion is the through hole 2c, and a white portion is a partition portion between the through holes 2c. As illustrated in FIG. 3, the plurality of through holes 2c having an approximately constant width are uniformly formed on the substrate 2. It is preferable that an opening rate of the through holes 2c in the effective region R (a ratio of all of the through holes 2c to the effective region R when seen from the thickness direction of the substrate 2) is practically 10% to 80%, and is particularly 60% to 80%. The sizes of the plurality of through holes 2c may be uneven with each other, and the plurality of through holes 2c may be partially connected to each other.

The substrate 2 illustrated in FIG. 3 is an alumina porous film that is formed by performing anodic oxidation with respect to aluminum (Al). Specifically, an anodic oxidation treatment is performed with respect to an Al substrate, and a surface portion that is oxidized is peeled off from the Al substrate, and thus, it is possible to obtain the substrate 2. Furthermore, the substrate 2 may be formed by performing anodic oxidation with respect to a valve metal other than Al, such as tantalum (Ta), niobium (Nb), titanium (Ti), hafnium (Hf), zirconium (Zr), zinc (Zn), tungsten (W), bismuth (Bi), and antimony (Sb), or may be formed by performing anodic oxidation with respect to silicon (Si).

Figure 4:
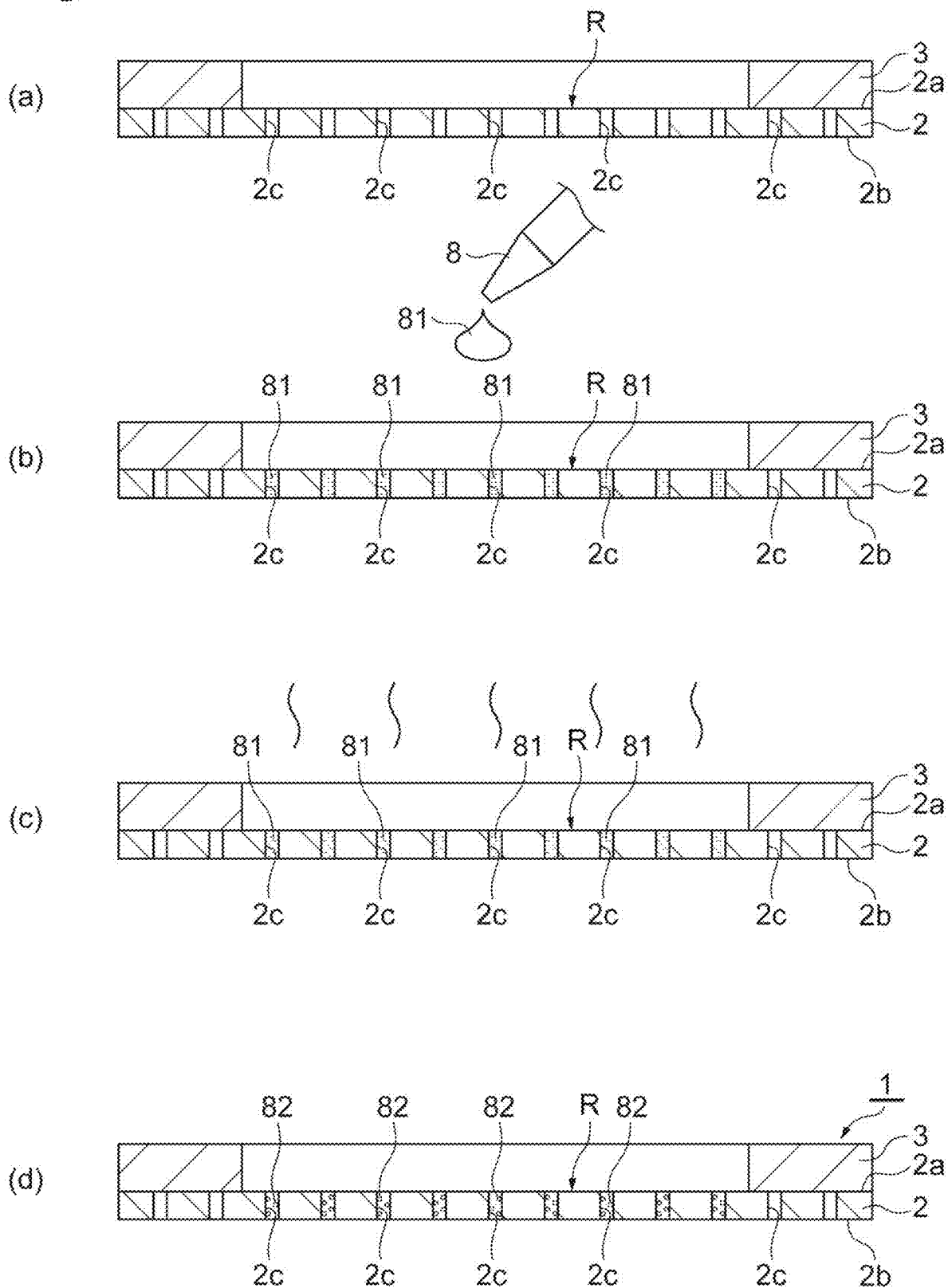
FIG. 4 is a diagram illustrating steps of a production method for a sample support body of one embodiment.

Next, a production method for the sample support body 1 will be described. In FIG. 4, the conductive layer 4 and the adhesive layer 5 in the sample support body 1 are not illustrated. In addition, for the convenience of illustration, a dimensional ratio or the like is different between the sample support body 1 illustrated in FIG. 1 and FIG. 2 and the sample support body 1 illustrated in FIG. 4.

First, as illustrated in (a) of FIG. 4, the substrate 2 in which the conductive layer 4 is provided on the first surface 2a is prepared in a state of being fixed to the frame 3 (a first step). The substrate 2 may be prepared by being produced by a person who carries out the laser desorption/ionization method and the mass spectrometry method, or may be prepared by being acquired from a producer, a seller, or the like of the substrate 2.

Subsequently, as illustrated in (b) of FIG. 4, a matrix solution 81 is introduced into the plurality of through holes 2c of the substrate 2 (a second step). Specifically, the matrix solution 81, for example, is dropped with respect to the plurality of through holes 2c from the first surface 2a side of the substrate 2 by a pipette 8. The matrix solution 81 is dropped into approximately the entire region of the effective region R. The matrix solution 81 is moved towards the second surface 2b side from the first surface 2a side of the substrate 2 through each of the through holes 2c. Each of the through holes 2c is filled with the matrix solution 81. The matrix solution 81 may be prepared by being produced by a person who carries out the laser desorption/ionization method and the mass spectrometry method, or may be prepared by being acquired from a producer, a seller, or the like of the matrix solution 81.

The matrix solution 81 is a solution containing the matrix 82. The matrix solution 81, for example, is a solution that is prepared by dissolving 10 mg of DHB in 1 ml of acetonitrile, or the like.

Subsequently, as illustrated in (c) of FIG. 4, the matrix solution 81 that is introduced into each of the through holes 2c is dried (a third step). Specifically, the substrate 2 into which the matrix solution 81 is introduced is exposed to the atmosphere, and thus, the matrix solution 81 is naturally dried. In a case where the matrix solution 81 is dried, as illustrated in (d) of FIG. 4, the crystals of the matrix 82 are obtained. That is, the matrix 82 that is crystallized is provided on the inner wall surface of the through hole 2c of the substrate 2. As described above, the sample support body 1 is produced.

Figure 5:
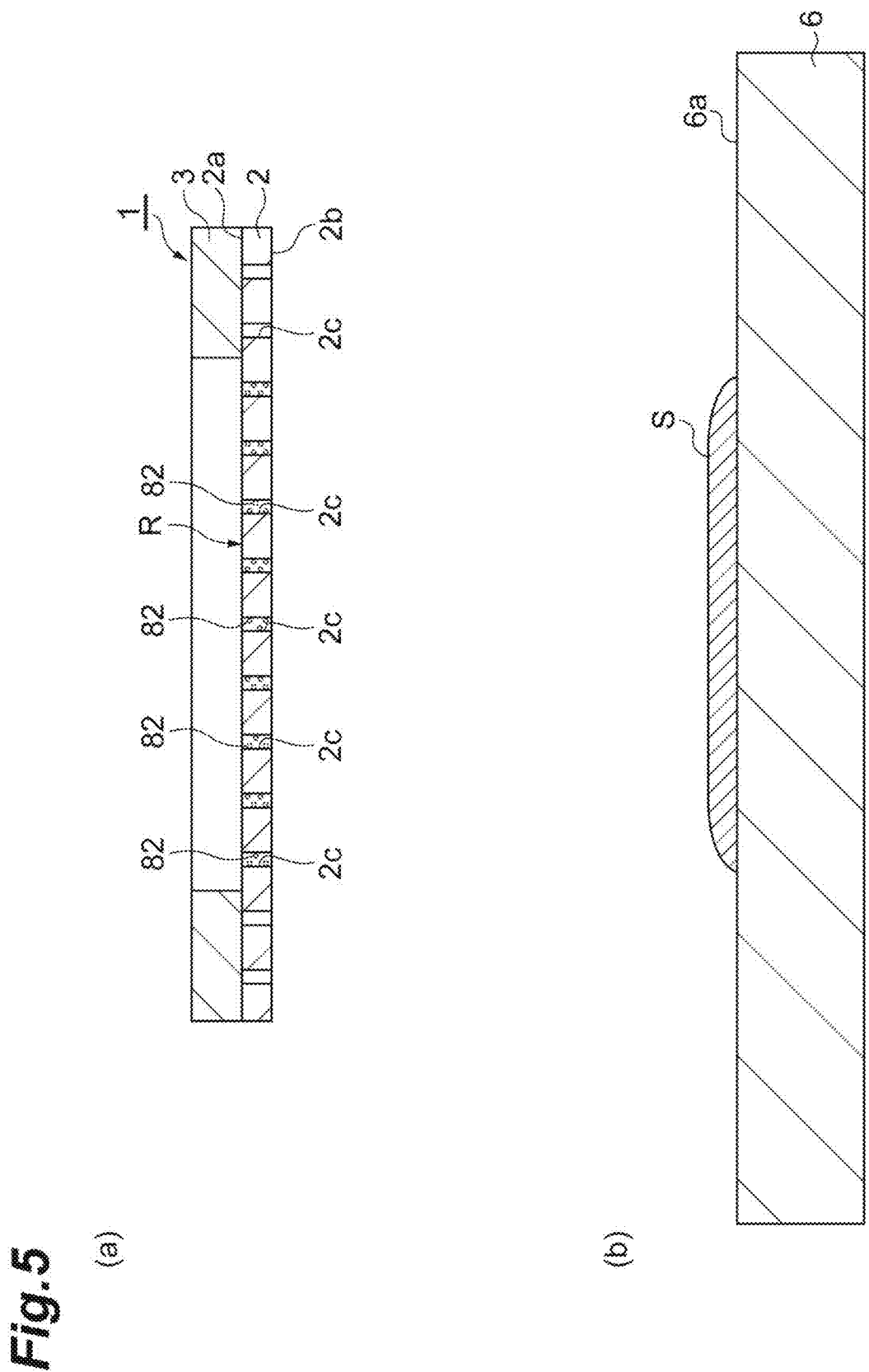
FIG. 5 is a diagram illustrating steps of a mass spectrometry method of one embodiment.
Figure 6:
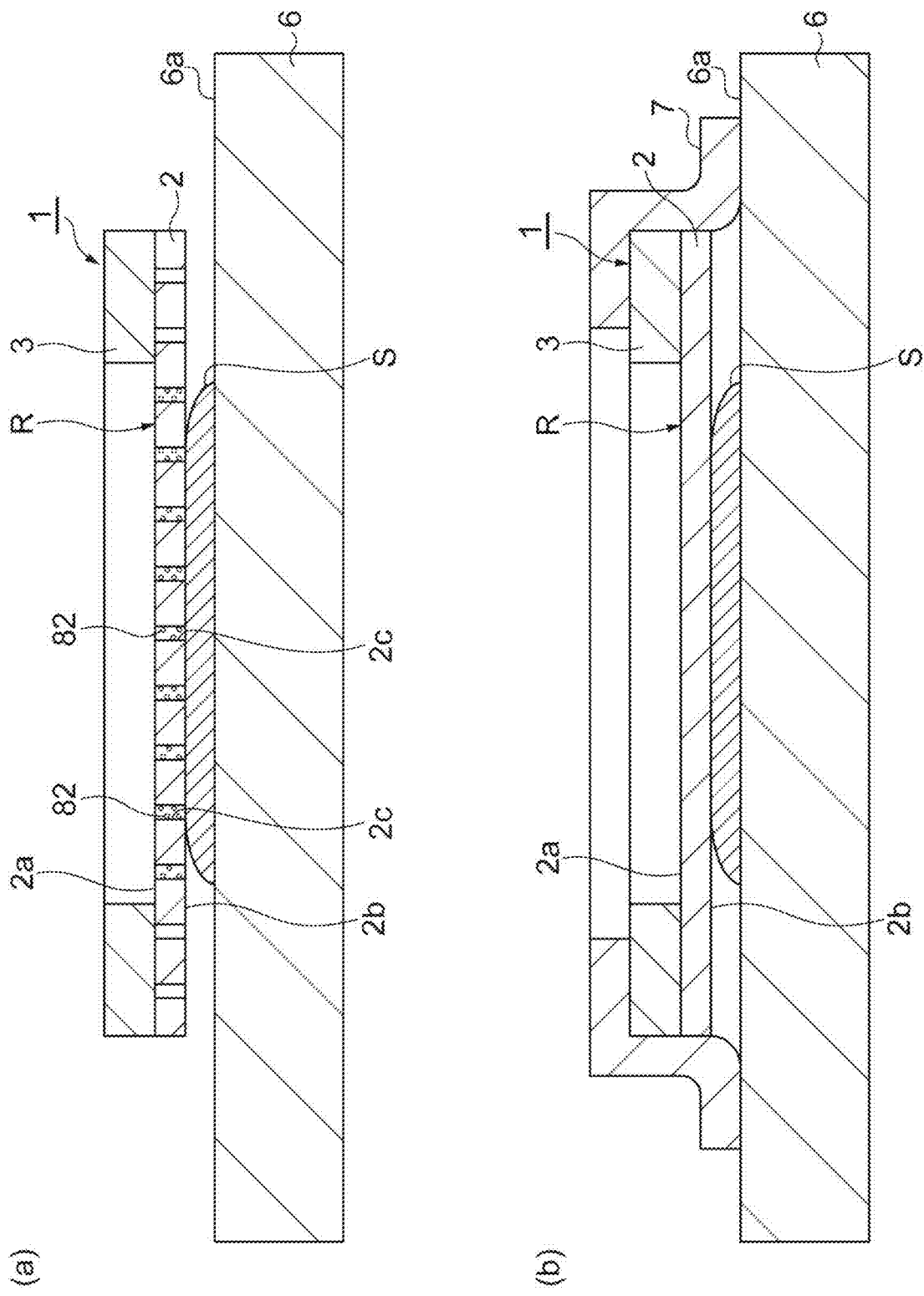
FIG. 6 is a diagram illustrating the steps of the mass spectrometry method of one embodiment.
Figure 7:
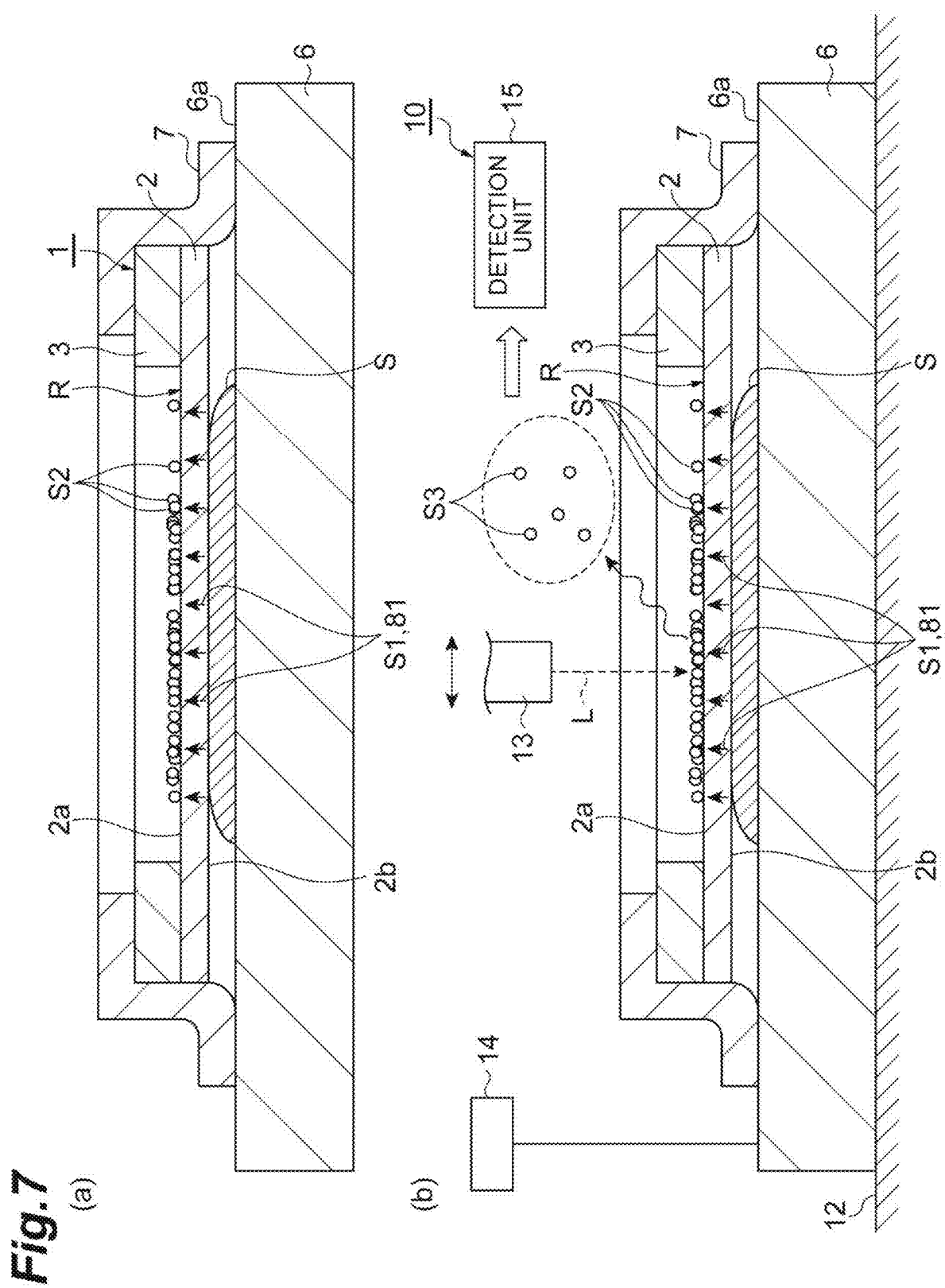
FIG. 7 is a diagram illustrating the steps of the mass spectrometry method of one embodiment.

Next, the laser desorption/ionization method and the mass spectrometry method in which the sample support body 1 is used will be described. In FIG. 5 to FIG. 7, the conductive layer 4 and the adhesive layer 5 in the sample support body 1 are not illustrated. In addition, for the convenience of illustration, a dimensional ratio or the like is different between the sample support body 1 illustrated in FIG. 1 and FIG. 2 and the sample support body 1 illustrated in FIG. 5 to FIG. 7.

First, as illustrated in (a) of FIG. 5, the sample support body 1 described above is prepared (a first step). The sample support body 1 may be prepared by being produced by a person who carries out the laser desorption/ionization method and the mass spectrometry method, or may be prepared by being acquired from a producer, a seller, or the like of the sample support body 1.

Subsequently, as illustrated in (b) of FIG. 5, the sample S that is a mass spectrometry target is mounted on a mounting surface 6a of a glass slide (a mounting portion) 6 (a second step). The glass slide 6 is a glass substrate on which a transparent conductive film such as an indium tin oxide (ITO) film is formed, and in the glass slide 6, the surface of the transparent conductive film is the mounting surface 6a. Furthermore, not only the glass slide 6 but also a member that is capable of ensuring conductivity (for example, a substrate or the like formed of a metal material, such as stainless steel, or the like) can be used as the mounting portion. Subsequently, as illustrated in (a) of FIG. 6, the sample support body 1 is disposed on the sample S such that the second surface 2b is in contact with the sample S (the second step). At this time, the sample S is disposed in the effective region R when seen from the thickness direction of the substrate 2. Here, the sample S, for example, is a thin film-like biological sample such as a tissue slice. The sample S is an aqueous sample. In addition, in order to smoothly move a component S1 of the sample S (refer to FIG. 7), a solution for decreasing the viscosity of the component S1 (for example, an acetonitrile mixed liquid or the like) may be mixed with the sample S. Subsequently, as illustrated in (b) of FIG. 6, the sample support body 1 is fixed to the glass slide 6, in a state where the second surface 2b of the substrate 2 is in contact with sample S. At this time, the sample support body 1 is fixed to the glass slide 6 by a tape 7 having conductivity (for example, a carbon tape or the like). Furthermore, in (b) of FIG. 6 and FIG. 7, the through hole 2c and the matrix 82 in sample support body 1 are not illustrated.

As illustrated in (a) of FIG. 7, in each of the through holes 2c, the component S1 of the sample S is mixed with the matrix 82 that is provided in each of the through holes 2c, and is moved towards the first surface 2a side from the second surface 2b side of the sample support body 1 through each of the through holes 2c. Then, a mixture S2 of the component S1 and the matrix 82 is accumulated on the first surface 2a side of the sample support body 1 in each of the through holes 2c by a surface tension.

Subsequently, as illustrated in (b) of FIG. 7, the glass slide 6, the sample support body 1, and the sample S are mounted on a support portion 12 of a mass spectrometry device 10 (for example, a stage), in a state where the sample S is disposed between the glass slide 6 and the sample support body 1. That is, the sample S is supported by the sample support body 1. Subsequently, a voltage is applied to the conductive layer 4 of the sample support body 1 (refer to FIG. 2) through the mounting surface 6a of the glass slide 6 and the tape 7 by a voltage application unit 14 of the mass spectrometry device 10 (a third step). Subsequently, the first surface 2a of the substrate 2 is irradiated with laser light L through the opening 3a of the frame 3 by a laser light irradiation unit 13 of the mass spectrometry device 10 (the third step). That is, the laser light L is applied to a region corresponding to the opening 3a of the frame 3 on the first surface 2a of the substrate 2 (that is, a region corresponding to the effective region R). Here, the laser light irradiation unit 13 scans the region corresponding to the effective region R with the laser light L. Furthermore, the scanning of the laser light L with respect to the region corresponding to the effective region R can be carried out by operating at least one of the support portion 12 and the laser light irradiation unit 13.

As described above, the first surface 2a of the substrate 2 is irradiated with the laser light L while a voltage is applied to the conductive layer 4. Accordingly, the component S1 that is moved to the first surface 2a side of the substrate 2 is ionized, and a sample ion S3 (the component S1 that is ionized) is emitted (the third step). Specifically, the conductive layer 4 (refer to FIG. 2), and the matrix 82 that is moved to the first surface 2a side of the substrate 2 along with the component S1 absorb the energy of the laser light L. The matrix 82 is gasified along with the component S1 by the energy. Then, a proton or a cation is added to the molecules of the component S1 that is gasified, and thus, the gasified component S1 becomes the sample ion S3. The first step to the third step described above correspond to the laser desorption/ionization method using the sample support body 1.

The sample ion S3 that is emitted is moved towards a ground electrode (not illustrated) that is provided between the sample support body 1 and an ion detection unit 15 while being accelerated. That is, the sample ion S3 is moved towards the ground electrode while being accelerated by a potential difference that occurs between the conductive layer 4 to which a voltage is applied and the ground electrode. Then, the sample ion S3 is detected by the ion detection unit 15 of the mass spectrometry device 10 (a fourth step). Here, the ion detection unit 15 detects the sample ion S3 to correspond to a scanning position of the laser light L. Accordingly, it is possible to image a two-dimensional distribution of the molecules configuring the sample S. Furthermore, here, the mass spectrometry device 10 is a scanning mass spectrometry device using a time-of-flight mass spectrometry (TOF-MS) method. The first step to the fourth step described above correspond to the mass spectrometry method using the sample support body 1.

As described above, in the laser desorption/ionization method, in a case where the sample support body 1 is disposed on the sample S, the component S1 of the sample S is moved to the first surface 2a side from the second surface 2b side through each of the through holes 2c by a capillary phenomenon and is mixed with the matrix 82. Then, in a case where the first surface 2a is irradiated with the laser light L while a voltage is applied to the conductive layer 4, the energy is transmitted to the component S1 of the sample S that is moved to the first surface 2a side. Accordingly, the component S1 is ionized. In the laser desorption/ionization method, the component S1 is ionized by being mixed with the matrix 82, and thus, it is possible to reliably ionize a component of a high-molecular-weight sample. In addition, the component S1 is moved to the first surface 2a side through the plurality of through holes 2c. For this reason, in the component S1 that is moved to the first surface 2a side of the substrate 2, position information of the sample S (two-dimensional distribution information of the molecules configuring the sample S) is maintained. In such a state, the first surface 2a of the substrate 2 is irradiated with the laser light L while a voltage is applied to the conductive layer 4, and thus, the component S1 of the sample S is ionized while the position information of the sample S is maintained. Accordingly, it is possible to improve a resolution of an image in imaging mass spectrometry. As described above, according to the laser desorption/ionization method, it is possible to ionize the high-molecular-weight sample S and to improve the resolution of the image in the imaging mass spectrometry.

According to the mass spectrometry method as described above, it is possible to perform imaging mass spectrometry in which the high-molecular-weight sample S can be ionized, and the resolution of the image can be improved.

According to the sample support body 1 as described above, it is possible to ionize the high-molecular-weight sample S as described above and to improve the resolution of the image in the imaging mass spectrometry.

In addition, in the sample support body 1, the substrate 2 is formed by performing anodic oxidation with respect to a valve metal or silicon. Accordingly, it is possible to suitably realize the movement of the component S1 of the sample S according to the by a capillary phenomenon described above.

In addition, in the sample support body 1, the width of the through hole 2c is 1 nm to 700 nm. In this case, it is possible to more smoothly move the component S1 of the sample S by the by a capillary phenomenon described above. In addition, it is possible to obtain sufficient signal intensity in mass spectrometry using the laser desorption/ionization method described above.

According to the production method for the sample support body 1 as described above, it is possible to produce the sample support body 1 in which the high-molecular-weight sample S as described above can be ionized, and the resolution of the image in the imaging mass spectrometry can be improved.

In addition, in the production method for the sample support body 1, in the second step, the matrix solution 81 is dropped with respect to the plurality of through holes 2c from the first surface 2a side. In this case, it is possible to easily introduce the matrix solution 81 to each of the through holes 2c.

FIG. 8 is a diagram illustrating a result according to a mass spectrometry method of a comparative example. In the comparative example, a sample support body in which the matrix 82 was not provided was used, and a two-dimensional distribution of a molecular weight of a brain slice of a mouse (the sample S) was imaged. As illustrated in (a) of FIG. 8, in the mass spectrometry method of the comparative example, it was not possible to obtain an ion image of phosphatide. Furthermore, in (a) of FIG. 8, an outline L1 of the sample S is represented by a virtual line. In addition, as illustrated in (b) of FIG. 8, in the mass spectrometry method of the comparative example, it was not possible to obtain a signal of the phosphatide.

FIG. 9 is a diagram illustrating a result according to a mass spectrometry method of an example. In the example, the sample support body 1 in which the matrix 82 was provided was used, and as with the comparative example, a two-dimensional distribution of a molecular weight of a brain slice of a mouse (the sample S) was imaged. As illustrated in (a) of FIG. 9, in the mass spectrometry method of the example, it was possible to obtain an ion image of phosphatide. Furthermore, in (a) of FIG. 9, an outline L2 of the sample S is represented by a virtual line. In addition, as illustrated in (b) of FIG. 9, in the mass spectrometry method of the example, it was possible to obtain a signal of the phosphatide.

FIG. 10 is a diagram illustrating a result according to a mass spectrometry method of another example. In another example, the sample support body 1 in which the matrix 82 was provided was used, and a two-dimensional distribution of a molecular weight of a liver slice of a mouse (the sample S) was imaged. As illustrated in (a) of FIG. 10, in the mass spectrometry method of another example, it was possible to obtain an ion image of phosphatide. Furthermore, in (a) of FIG. 10, an outline L3 of the sample S is represented by a virtual line. In addition, as illustrated in (b) of FIG. 10, in the mass spectrometry method of the example, it was possible to obtain a signal of the phosphatide.

In addition, in the mass spectrometry method of the example and another example, the width of each of the through holes 2c was 1 nm to 700 nm, and thus, it was possible to obtain sufficient signal intensity with respect to a high-molecular-weight sample.

The present disclosure is not limited to the embodiment described above. For example, the conductive layer 4 may not be provided on the second surface 2b of the substrate 2 and the inner surface of the through hole 2c insofar as the conductive layer 4 is provided on at least the first surface 2a of the substrate 2. In addition, the conductive layer 4 may be provided on the second surface 2b of the substrate 2 and the inner surface of the through hole 2c. In addition, the sample support body 1 may be fixed to the glass slide 6 by means other than the tape 7 (for example, means using an adhesive agent, a fixing tool, or the like).

In addition, in the sample support body 1, the substrate 2 may have conductivity, in the third step of the laser desorption/ionization method and the mass spectrometry method described above, a voltage may be applied to the substrate 2. In this case, it is possible to omit the conductive layer 4 from the sample support body 1, and to obtain the same effect as that in the case of using the sample support body 1 including the conductive layer 4 as described above.

In addition, an example has been described in which in the second step of the production method for the sample support body 1 described above, the matrix solution 81 is dropped with respect to the plurality of through holes 2c from the first surface 2a side, but the matrix solution 81 may be dropped with respect to the plurality of through holes 2c from the second surface 2b side. In addition, the matrix solution 81, for example, may be applied with respect to the plurality of through holes 2c from the first surface 2a side or the second surface 2b side of the sample support body 1 with approximately a uniform amount by an air brush or the like. In addition, as illustrated in FIG. 11, an example has been described in which in the second step of the production method for the sample support body 1, the substrate 2 on which the conductive layer 4 is provided, for example, may be dipped in the matrix solution 81 contained in a container 16, in a state of being fixed to the frame 3. In any case, it is possible to easily introduce the matrix solution 81 into each of the through holes 2c.

In addition, an example has been described in which in the third step of the production method for the sample support body 1, the matrix solution 81 is naturally dried, but the matrix solution 81 may be forcedly dried.

In addition, in the third step of the laser desorption/ionization method and the mass spectrometry method described above, a voltage may be applied to the conductive layer 4 without the mounting surface 6a of the glass slide 6 and the tape 7. In this case, the glass slide 6 and the tape 7 may not have conductivity.

In addition, in the mass spectrometry device 10, the region corresponding to the effective region R may be irradiated with the laser light L by the laser light irradiation unit 13 at one time, and the sample ion S3 may be detected by the ion detection unit 15 while two-dimensional information of the region is maintained. That is, the mass spectrometry device 10 may be a stigmatic mass spectrometry device.

In addition, the laser desorption/ionization method described above can be used not only in the imaging mass spectrometry in which the two-dimensional distribution of the molecules configuring the sample S is imaged, but also in other measurements and tests such as ion mobility measurement.

In addition, an example has been described in which the opening 3a of the frame 3 is in the shape of a circle when seen from the thickness direction of the substrate 2, but the opening 3a may be in various shapes. The opening 3a of the frame 3, for example, may be in the shape of a rectangle.

In addition, an example has been described in which the sample S is mounted on the glass slide 6, but the sample S may be directly mounted on the support portion 12 of the mass spectrometry device 10. At this time, the support portion 12 of the mass spectrometry device 10 corresponds to the glass slide 6.

REFERENCE SIGNS LIST

1: sample support body, 2: substrate, 2a: first surface, 2b: second surface, 2c: through hole, 4: conductive layer, 6: glass slide (mounting portion), 6a: mounting surface, 81: matrix solution, 82: matrix, L: laser light, S: sample, S1: component.

The invention claimed is:

1. A laser desorption/ionization method, comprising:
a first step of preparing a sample support body including a substrate on which a plurality of through holes opening to a first surface and a second surface facing each other are formed, a conductive layer disposed on at least the first surface, and a matrix provided in the plurality of through holes;
a second step of mounting a sample on a mounting surface of a mounting portion, and of disposing the sample support body on the sample such that the second surface is in contact with the sample; and
a third step of ionizing a component of the sample that is mixed with the matrix and is moved to the first surface side from the second surface side through the through hole by irradiating the first surface with laser light while a voltage is applied to the conductive layer, in a state in which the sample is disposed between the mounting portion and the sample support body.

2. A mass spectrometry method, comprising:
each of the steps of the laser desorption/ionization method according to claim 1; and
a fourth step of detecting the component that is ionized in the third step.

3. A laser desorption/ionization method, comprising:
a first step of preparing a sample support body including a substrate having conductivity on which a plurality of through holes opening to a first surface and a second surface facing each other are formed, and a matrix provided in the plurality of through holes;
a second step of mounting a sample on a mounting surface of a mounting portion, and of disposing the sample support body on the sample such that the second surface is in contact with the sample; and
a third step of ionizing a component of the sample that is mixed with the matrix and is moved to the first surface side from the second surface side through the through hole by irradiating the first surface with laser light while a voltage is applied to the substrate, in a state in which the sample is disposed between the mounting portion and the sample support body.

4. A mass spectrometry method, comprising:
each of the steps of the laser desorption/ionization method according to claim 3; and
a fourth step of detecting the component that is ionized in the third step.

5. A sample support body supporting a sample in a laser desorption/ionization method, the sample support body comprising:
a substrate on which a plurality of through holes opening to a first surface and a second surface facing each other are formed;
a conductive layer provided on at least the first surface; and
a matrix provided in the plurality of through holes.

6. The sample support body according to claim 5,
wherein the substrate is formed by performing anodic oxidation with respect to a valve metal or silicon.

7. The sample support body according to claim 5,
wherein a width of the through hole is 1 nm to 700 nm.

8. A sample support body supporting a sample in a laser desorption/ionization method, the sample support body comprising:
a substrate having conductivity on which a plurality of through holes opening to a first surface and a second surface facing each other are formed; and
a matrix provided in the plurality of through holes.

9. A production method for a sample support body supporting a sample in a laser desorption/ionization method, the production method comprising:
a first step of preparing a substrate on which a plurality of through holes opening to a first surface and a second surface facing each other are formed, and a conductive layer is provided on at least the first surface;
a second step of introducing a matrix solution into the plurality of through holes; and
a third step of drying the matrix solution.

10. The production method for a sample support body according to claim 9,
wherein in the second step, the matrix solution is dropped with respect to the plurality of through holes from the first surface side or the second surface side.

11. The production method for a sample support body according to claim 9,
wherein in the second step, the substrate is dipped in the matrix solution.

12. A production method for a sample support body supporting a sample in a laser desorption/ionization method, the production method comprising:
a first step of preparing a substrate having conductivity on which a plurality of through holes opening to a first surface and a second surface facing each other are formed;
a second step of introducing a matrix solution into the plurality of through holes; and
a third step of drying the matrix solution.

* * * * *